(12) United States Patent
Moon et al.

(10) Patent No.: US 6,898,591 B1
(45) Date of Patent: *May 24, 2005

(54) METHOD AND APPARATUS FOR SERVER RESPONDING TO QUERY TO OBTAIN INFORMATION FROM SECOND DATABASE WHEREIN THE SERVER PARSES INFORMATION TO ELIMINATE IRRELEVANT INFORMATION IN UPDATING DATABASES

(76) Inventors: Billy Gayle Moon, 305 Parkbranch La., Apex, NC (US) 27502; Tripurasundari Ramesh, 403 Danton Dr., Cary, NC (US) 27511; Vikas Jain, 5801-13 Tattersall Dr., Durham, NC (US) 27713; Brian Bankler, 910 Balmoral Dr., Cary, NC (US) 27511

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 539 days.

(21) Appl. No.: 08/965,002

(22) Filed: Nov. 5, 1997

(51) Int. Cl.[7] .............................................. G06F 17/30
(52) U.S. Cl. ..................... 707/3; 707/1; 707/4; 707/5; 707/10; 707/102; 707/104.1; 707/200; 345/963; 345/968; 708/112
(58) Field of Search ................... 707/1–10, 100–104.1, 707/200–204, 501, 513, 530; 395/500, 200.79, 200.37, 200.33, 200.34; 705/35, 1, 5, 6; 709/206, 216–219, 220, 229, 230–232; 340/990–995; 345/963, 968; 708/112

(56) References Cited

U.S. PATENT DOCUMENTS

| 5,129,086 A | 7/1992 | Coyle, Jr. et al. ............ 719/328 |
|---|---|---|
| 5,185,857 A | 2/1993 | Rozmanith et al. .......... 715/507 |
| 5,261,094 A | 11/1993 | Everson et al. .............. 707/201 |
| 5,278,978 A | 1/1994 | Demers et al. .............. 707/101 |
| 5,315,709 A | 5/1994 | Alston, Jr. et al. ............... 707/6 |
| 5,398,335 A | 3/1995 | Lewis ............................ 707/3 |
| 5,404,488 A | 4/1995 | Kerrigan et al. ............. 711/133 |
| 5,497,463 A * | 3/1996 | Stein et al. ................... 709/203 |
| 5,542,078 A | 7/1996 | Martel et al. ................ 707/101 |
| 5,543,789 A * | 8/1996 | Behr et al. ................... 340/995 |
| 5,590,288 A | 12/1996 | Castor et al. ................ 709/201 |
| 5,600,831 A * | 2/1997 | Levy et al. .................. 395/602 |
| 5,608,874 A | 3/1997 | Ogawa et al. ............... 709/246 |
| 5,630,127 A * | 5/1997 | Moore et al. ................ 707/104 |
| 5,634,051 A * | 5/1997 | Thomson .................... 395/605 |
| 5,634,053 A * | 5/1997 | Noble et al. .................... 707/4 |

(Continued)

FOREIGN PATENT DOCUMENTS

| EP | 0 550 368 A2 | 7/1993 | ................... 15/403 |
| WO | WO96/37853 | 11/1996 | .................... 17/30 |
| WO | WO97/15017 | 4/1997 | .................... 17/30 |

*Primary Examiner*—Srirama Channavajjala
(74) *Attorney, Agent, or Firm*—Coats & Bennett, P.L.L.C.

(57) ABSTRACT

A method and apparatus for updating databases is disclosed. A database is updated transparently using an IDL (Interface Descriptive Language) to interface with websites on the WWW (World Wide Web). Multi-media information is parsed such that the relevant information can be integrated into an application or application framework for a user's use. The update can be performed when the device moves to a new location or a particular event occur and can be used to re-configure an entire system or just a particular application. In some embodiments, the device checks to see if a particular database is already available before obtaining a new database. The device can purge unused databases to provide space for new or additional databases.

23 Claims, 7 Drawing Sheets

U.S. PATENT DOCUMENTS

| | | | |
|---|---|---|---|
| 5,644,721 A | * 7/1997 | Chung et al. | 395/206 |
| 5,655,116 A | 8/1997 | Kirk et al. | 707/1 |
| 5,666,553 A | 9/1997 | Crozier | 715/540 |
| 5,671,436 A | * 9/1997 | Morris et al. | 395/800 |
| 5,680,618 A | 10/1997 | Freund | 707/7 |
| 5,682,525 A | * 10/1997 | Bouve et al. | 707/104 |
| 5,710,887 A | * 1/1998 | Chelliah et al. | 705/26 |
| 5,778,367 A | * 7/1998 | Wesinger, Jr. et al. | 707/10 |
| 5,790,974 A | * 8/1998 | Tognazzini | 701/204 |
| 5,793,497 A | * 8/1998 | Funk | 358/402 |
| 5,794,218 A | * 8/1998 | Jennings et al. | 705/35 |
| 5,794,250 A | * 8/1998 | Carino, Jr. et al. | 707/104 |
| 5,819,227 A | * 10/1998 | Obuchi | 705/1 |
| 5,825,759 A | * 10/1998 | Liu | 370/331 |
| 5,832,498 A | * 11/1998 | Exertier | 707/103 |
| 5,842,009 A | * 11/1998 | Borovoy et al. | 707/1 |
| 5,855,015 A | * 12/1998 | Shoham | 707/5 |
| 5,857,201 A | * 1/1999 | Wright, Jr. et al. | 707/104 |
| 5,896,566 A | * 4/1999 | Averbuch et al. | 455/419 |
| 5,899,998 A | * 5/1999 | McGauley et al. | 707/104 |
| 5,937,413 A | * 8/1999 | Hyun et al. | 707/201 |
| 5,938,721 A | * 8/1999 | Dussell et al. | 701/211 |
| 5,950,144 A | * 9/1999 | Hall et al. | 702/108 |
| 5,958,006 A | * 9/1999 | Eggleston et al. | 709/219 |
| 5,959,577 A | * 9/1999 | Fan et al. | 342/357.13 |
| 5,974,238 A | * 10/1999 | Chase, Jr. | 395/200.78 |

* cited by examiner

METHOD AND APPARATUS FOR SERVER RESPONDING TO QUERY TO OBTAIN INFORMATION FROM SECOND DATABASE WHEREIN THE SERVER PARSES INFORMATION TO ELIMINATE IRRELEVANT INFORMATION IN UPDATING DATABASES

BACKGROUND

The present invention relates to updating databases, and more particularly, to transparently updating a database with information available on a computer network or server.

Computers (or computer-related devices) generally use hardware, a power source, stored information, programmable memory, and user input to assist computer users in a countless number of tasks. Unfortunately a computer can only store a limited amount of information. For this reason, computer users often connect to a network or server to obtain additional information. A modem or a similar telecommunication device allows computers to transmit and receive information from other computers. By connecting to the Internet, a computer has access to networks and servers throughout the world.

Computers have become increasingly useful as they have become smaller in size. The traditional desktop computer has been replaced by smaller computers, which are sometimes referred to as laptops, palmtops, or Personal Digital Assistant (PDAs). With the development of wireless technologies, these portable computers can send and receive information from anywhere in the world. These portable computers are particularly useful for the traveling business person (TBP) and are often used by the TBP in a number of different locations.

The information used by a single computer can be referred to generally as a collection of databases. Some of these databases are permanently set in the hardware and are used for the basic operation of the device. Other databases are a permanent part of the software and are used for configuring that particular software. Still other databases are a temporary part of the software. These databases can be stored separate from the software and are usually used for a particular purpose, such as storing numbers used in numerical functions. These temporary databases can be downloaded from a network or server, or generally speaking, from the Internet. While most computers are able to download information, Applicants are unaware of any existing products or methods for updating a database transparently, i.e., without significant user interaction. For example, Applicants are unaware of any products or methods for interfacing with the Internet and obtaining information to update a local database without user interaction.

Conventional devices require the user to manually download information or stay on-line to use a selected Internet website. This usually means that the user has to close or discontinue using a particular application while downloading the information. In most cases, the user has to generate a query and/or find a particular web site. If the user stays on-line, the user usually has to pay additional online, cellular, or long distance charges. Downloaded information is usually stored in a file on the user's computer that has to be opened and manipulated by the user. If the user wants to use different information or ensure that particular information is up to date, he has to repeat this process. In addition, the user has no way of knowing when a particular database stored on his or her computer was last updated, and as a result, the user might make calculations based on out-of-date information. Moreover, if the product is shipped to a different country and the correct language is not loaded, the user might not even have the necessary instructions to operate the device.

SUMMARY

These and other drawbacks, problems, and limitations of conventional products are overcome according to exemplary embodiments of the present invention. Exemplary embodiments of the present invention allow a user of a particular application to readily benefit from information available on a network or the Internet. According to the present invention, a database is updated transparently, i.e., it is not necessary for the user to exit the application, monitor the updating, or perform any related steps. In an exemplary embodiment, an IDL (Interface Descriptive Language) interfaces with websites on the World Wide Web (WWW) to find and obtain relevant information for updating a currency database stored on a remote computer. The retrieved information is then integrated into an application or application framework for the user's use.

In some embodiments, the application indicates the time the database was last updated to assist the user in determining when to update a database. In other embodiments, the database updates itself automatically or periodically (e.g., daily, weekly, or hourly). In still other embodiments, the application updates itself when the device moves to a new location or a particular event occurs.

In further embodiments, the device checks to see if a particular database is already available before downloading a new database. In addition, the device can purge unused or less used databases to provide space for new databases.

In further embodiments, an application can use a downloaded database to dynamically build and update its graphic user interface (GUI), which can include the menus, icons, controls, dialog boxes, or error messages.

In further embodiments, the device can discern its location and choose a particular database accordingly.

In a preferred embodiment, the device uses a hierarchical database structure to maximize the amount of information available to the user. Databases are designated as global or local databases. A database can be used to re-configure an entire system or just a particular application. Furthermore, the device can recognize individual users and store the preferences of each. If a particular event occurs, the device can use a local database or obtain a new database to provide a particular default setting.

BRIEF DESCRIPTION OF THE DRAWINGS

The foregoing, and other objects, features, and advantages of the present invention will be more readily understood upon reading the following detailed description in conjunction with the drawings in which.

DETAILED DESCRIPTION

Figure 1:
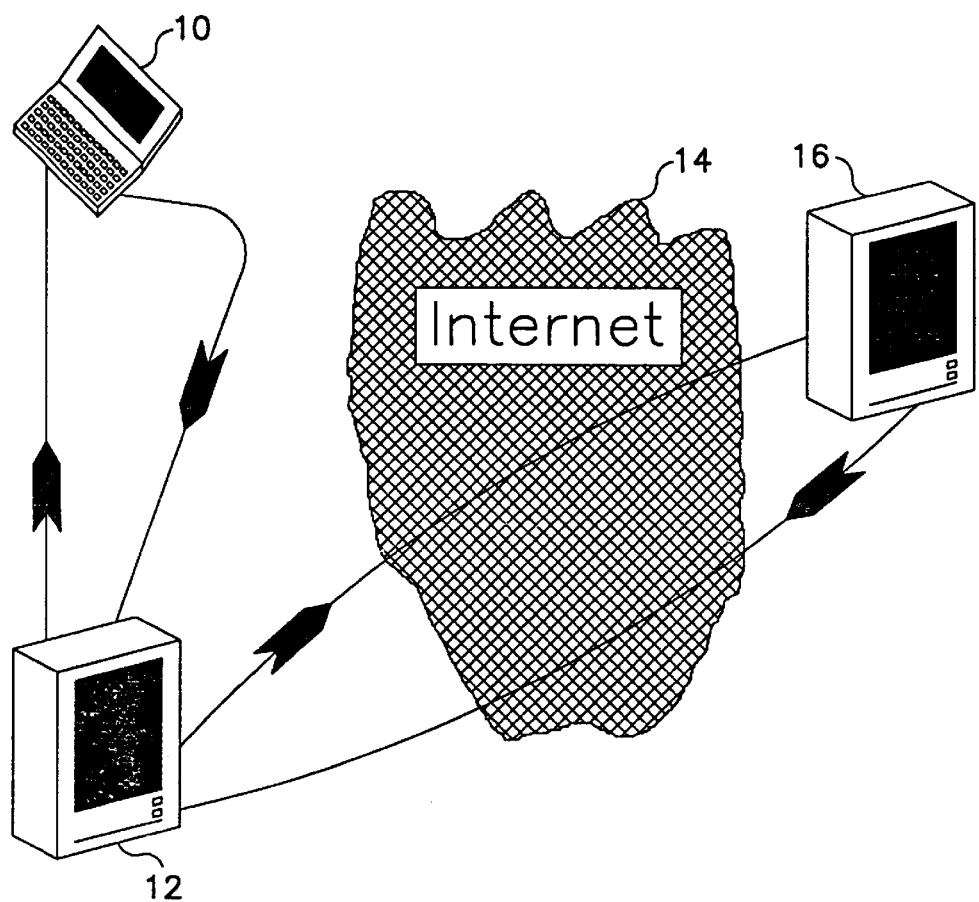
FIG. 1 illustrates a computer-related device and two servers.

Referring now to the drawings, FIG. 1 illustrates a computer-related device and two servers. The computer 10 can be a traditional desktop computer or a smaller handheld device. The computer 10 may or may not have a keyboard for entering information. The computer 10 may instead have a touch pad, a touch screen, or a stylus for entering information. In some models, the computer 10 provides both data and voice communications and can communicate freely with modern cellular and satellite communication systems.

The computer 10 can connect to a network or a server 12 either directly or indirectly. A server is a computer that provides services to other computers on a network. The computer 10 may already be connected to a network, or the computer 10 might use a modem to transmit and receive information via commercial phone lines or other channels. This connection might be a wired connection such as twisted pair, coaxial cable, or optical fiber; or this connection might be a wireless connection such as a microwave, infrared, or radiowave signal. The computer 10 might be connected to a single network, multiple networks, or the Internet. When the computer 10 connects to the Internet, the computer 10 has access to networks and servers throughout the world.

If the computer 10 is not already part of a network, the computer 10 might access the Internet via an Internet Service Provider (ISP). The ISP may or may not interface with a regional network or a regional network operator. ISPs and regional networks are typically connected to highspeed backbones. Different ISPS, Regional Networks, and Backbones interconnect at National Access Points (NAPS) or other points of interconnection such as Points of Presence (POPs) to form what is commonly referred to as the World Wide Web or the Internet 14.

The server 12 may or may not be provided by the same ISP or regional network accessed by the computer 10. If the server 12 is provided by a different ISP or regional network then the computer 10 may have to route information through a point of interconnection such as a NAP or a POP to access the server 12. According to the current protocol, information is routed in the form of packets using a HTTP (hypertext transfer protocol) address such that the information sent and received by the computer 10 can take multiple paths to a particular server 12. According to other protocols, the information can be sent and received via reserved channels.

If the server 12 receives a request from computer 10, the server 12 can access a server 16 somewhere on the WWW 14. The server 12 should be programmed to contact the correct server 16 and to interact with it correctly. The server 12 should be able to receive information from the server 16. The information received from the server 16 is usually multi-media rich such that the server 12 parses out unwanted information and returns only relevant information to the computer 10.

Figure 2:
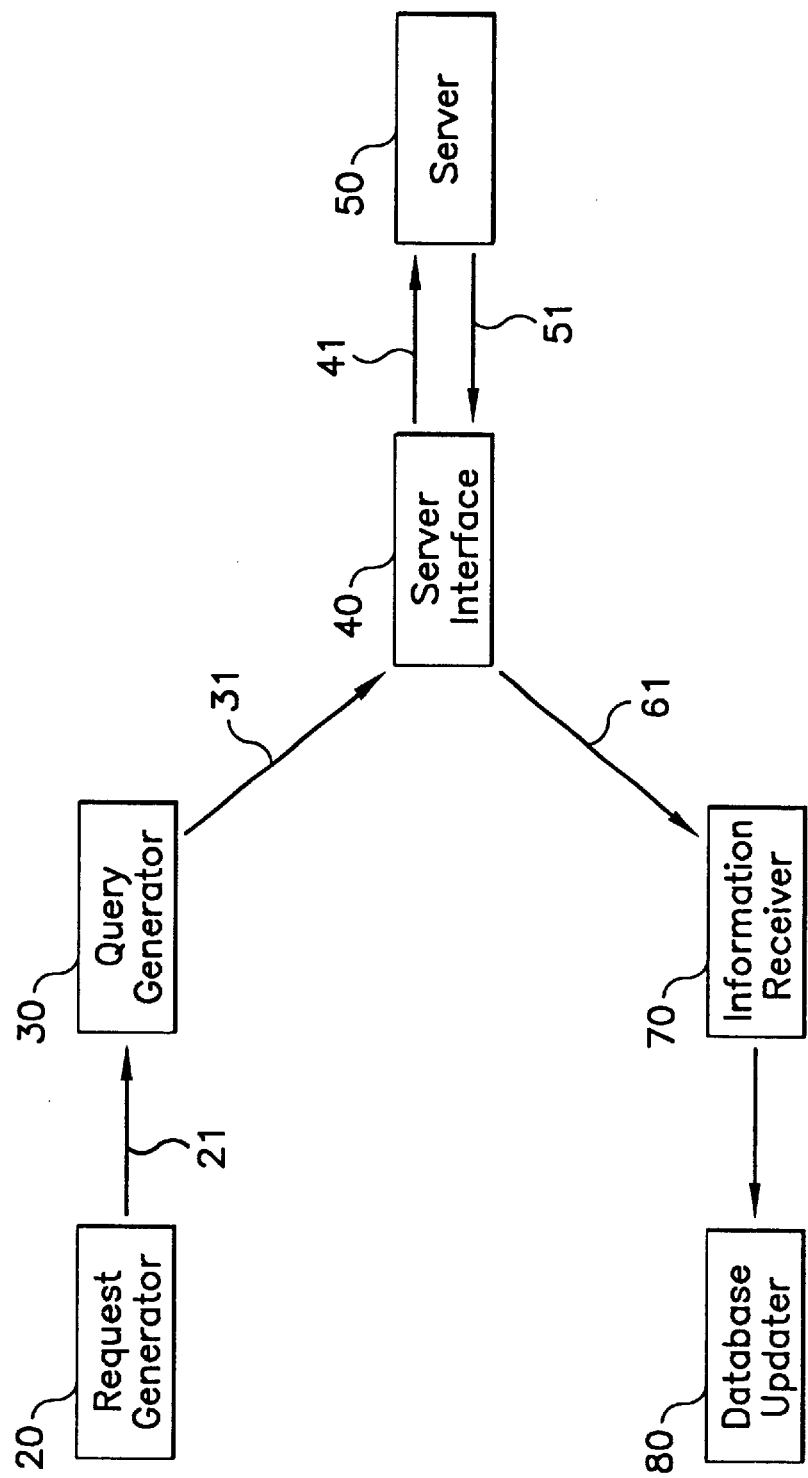
FIG. 2 shows schematically how a database is updated in an exemplary embodiment of the present invention.

FIG. 2 shows schematically how a computer 10 (shown in FIG. 1) updates a database in an exemplary embodiment of the present invention. The computer 10 has a request generator 20 that generates a request 21. The request 21 can be generated as the result of user input, an instruction, a change in the location of the computer, or a particular event, such as the receiving or sending of an e-mail or a phone call.

The request 21 is received by an information center or a query generator 30. The query generator can be constructed wholly separate from or as part of the computer 10 (shown in FIG. 1) and/or the server 12 (shown in FIG. 1). In an exemplary embodiment, the query generator 30 checks previous updates, location readings, and event readings to generate the most appropriate query 31.

The query 31 is received by a server or web interface 40. The server interface 40 interfaces with the server 50 to obtain information 51. The server interface 40 can use an IDL 41 to interface with the server 50. An exemplary IDL is described in more detail below. The information 51 received from the server 50 is usually multi-media rich. The server interface 40 can parse unwanted information and return only the relevant information 61 to an information receiver 70. The information receiver 70 uses a database up-dater 80 to update a database. The updated database can be used to configure the applications used by the computer 10 or it can be used by a particular application for a particular purpose.

In a preferred embodiment, the web interface 40 uses a script file to describe an IDL that interfaces with a particular website to extract information. An IDL can be written to do a specific task, and in this case, the IDL is written to follow an abstract map of the website and extract information. The map can describe the website in terms of a table such that the IDL knows exactly or approximately where the information is to be found. The extracted information can be turned into data objects that are manipulated by additional code. The IDL should be written to anticipate minor changes in the layout of the website. However, if the structure of the website changes drastically, the IDL should be changed accordingly.

Figure 3:
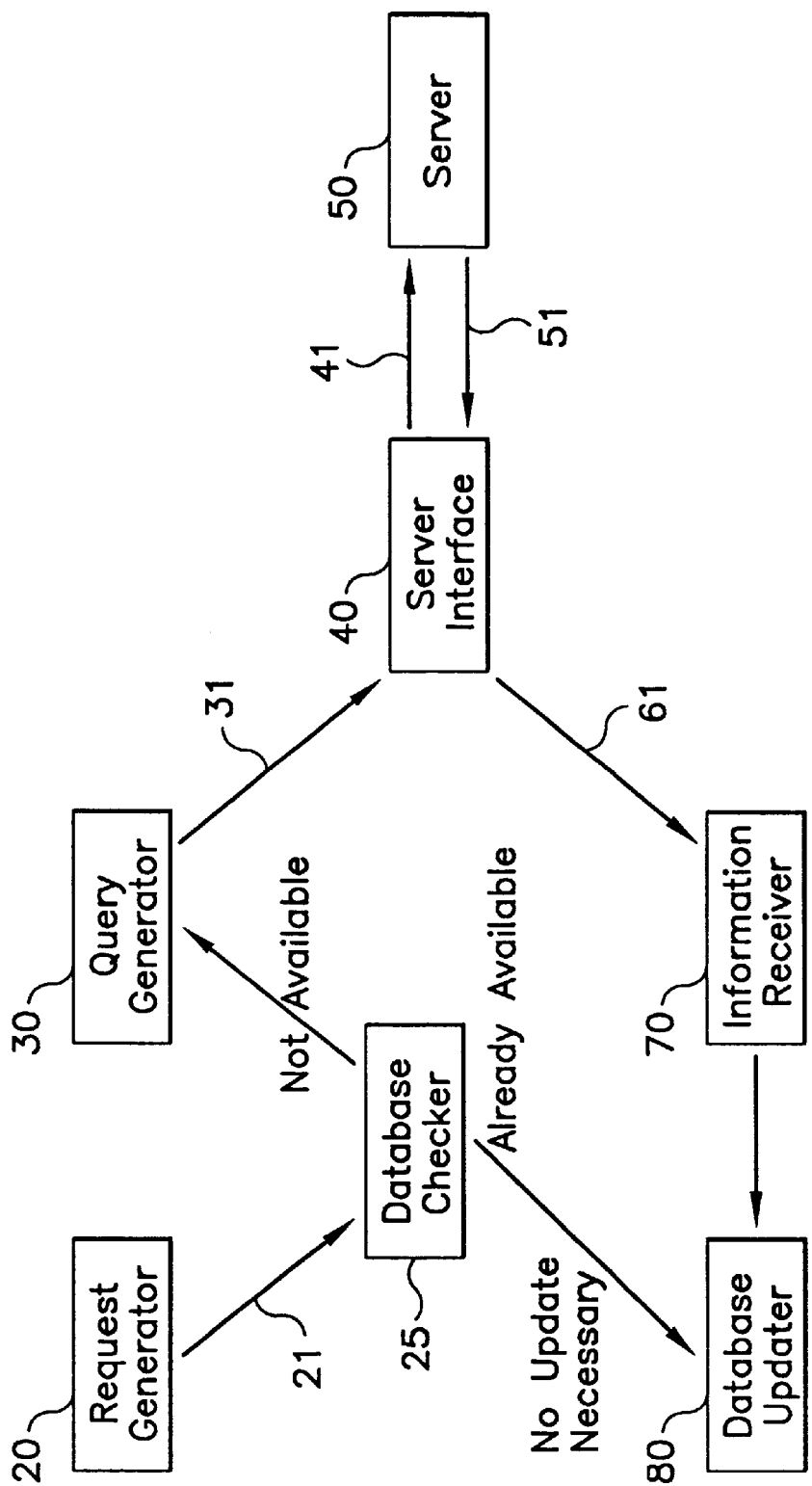
FIG. 3 shows schematically how a database is updated in another exemplary embodiment of the present invention.

FIG. 3 shows schematically how a database is updated according to another exemplary embodiment of the present invention. The computer 10 has a request generator 20 that generates a request 21. However, the request generator 20 passes the request to a database checker 25 that works in conjunction with the information center or query generator 30. The database checker 25 checks local databases to determine what information is already available locally. If the requested information is available locally, then the database checker 25 informs the device that it is not necessary to send a query 31 to the web or server interface 40. If the request information is not available locally, the database checker 25 informs the query generator 30 of what information is needed.

If necessary, the database checker 25 can check the programmable memory to determine if there is enough available memory for the anticipated new information 61. If there is not enough memory, then the database checker 25 can tell the computer 10 to purge non-essential databases or other files to create additional space.

As in FIG. 2, the query generator 30 provides a query 31 to a server or web interface 40. The server interface 40 interfaces with a server 50 and can parse information 51 to provide information 61. The server interface passes information 61 to a information receiver 70 and a database up-dater 80.

It will be appreciated by those skilled in the art that for some applications it is more important that the computer 10 (shown in FIG. 1) check to see if a database is already available on computer to before upgrading it or obtaining a new one. If, for example, the present invention is used in a particular embodiment to obtain currency conversion rates, it is not as important to check the database for local databases before upgrading it. If, however, the present invention is used, for example, 10 provide language translation then it is more important to check the memory to see if the language database is already stored locally before obtaining a new database. Language databases do not fluctuate or change as frequently as currency conversion rate databases do, and therefore, do not need to be upgraded as often.

Using the example of currency conversion, techniques for updating databases according to the present invention can be implemented by a computer application for currency conversion. For example, the request 21 can be a request to update the currency conversion rates stored in a local database at computer 10. The user can push a button or click on a icon displayed on a graphical user interface (GUI) of computer 10 to generate the request 21. Alternatively, the computer application could be programmed or set to update the local currency conversion database periodically or when, for example, the computer 10 enters a new country.

The query generator 30 can look to see what default conversions are currently displayed on a graphic user interface (GUI) and generate a query 31 for these conversion rates. Additionally the query generator 30 can check to see if the user has recently entered a new country or made a phone call to a different country and obtain the currency rate for these countries as well. The query generator 30 sets, for example, the Uniform Resource Locator (URL) and filter parameters and sends the query 31 to the web interface 40. The web interface 40 uses the information provided by the query generator 30 to connect to the correct server 50. The web interface 40 parses the information received from the server 50 and provides the computer 10 (shown in FIG. 1) with information with which it can update the appropriate database. This updated database is then used for the currency calculation.

Using the example of language translation, the request generator 20 in FIG. 3 can be implemented in an application for language translation. An American user of the computer 10 could use the application, for example, to translate an e-mail message to Dutch before sending it to a friend in Holland; and similarly, translate the reply message back to English. Alternatively, the request generator 20 can be part of the operating memory of the computer 10 and used to configure all or some of the applications that run on it. For example, a computer 10 transported to Holland could automatically configure itself such that all instructions are in Dutch.

As shown in FIG. 3, the database checker 25 would receive the request 21 and check to see if the necessary language database is available. If the database is available, the database checker informs the application or operating system that the database is available to perform the requested translation. If the language database is unavailable then the database checker informs the query generator 30 to generate a query 31, which the server interface 40 uses to interface with a server 50. The web interface 40 then sends the necessary information 61 to information receiver 70; and, the database up-dater 80 adds the database to the local cache of language databases. If necessary, the computer 10 can delete unused databases to provide additional space. The computer then uses the new database to perform the desired translations or configurations.

The ability to download language databases on demand allows the computer to be smaller in size while remaining as useful as a larger computer. The memory is maximized because the databases are stored according to need and the amount of usage. The databases can be purged depending on their usage statistics and the last time they were used.

Moreover, language databases can be used to configure the software and build controls dynamically. The computer can display control names using a language database corresponding to the current location of the computer. For example, a computer that is made in Sweden and shipped to China, can automatically load a Chinese database when it is first powered up so that the computer can display application controls, GUI panel messages, and/or error messages in Chinese. No longer is it necessary to individually configure manufactured computers because the computers can automatically configure themselves upon arrival at their initial destination. A computer can change its display whenever it is used in a new or different country or the user can override this feature.

Figure 4:
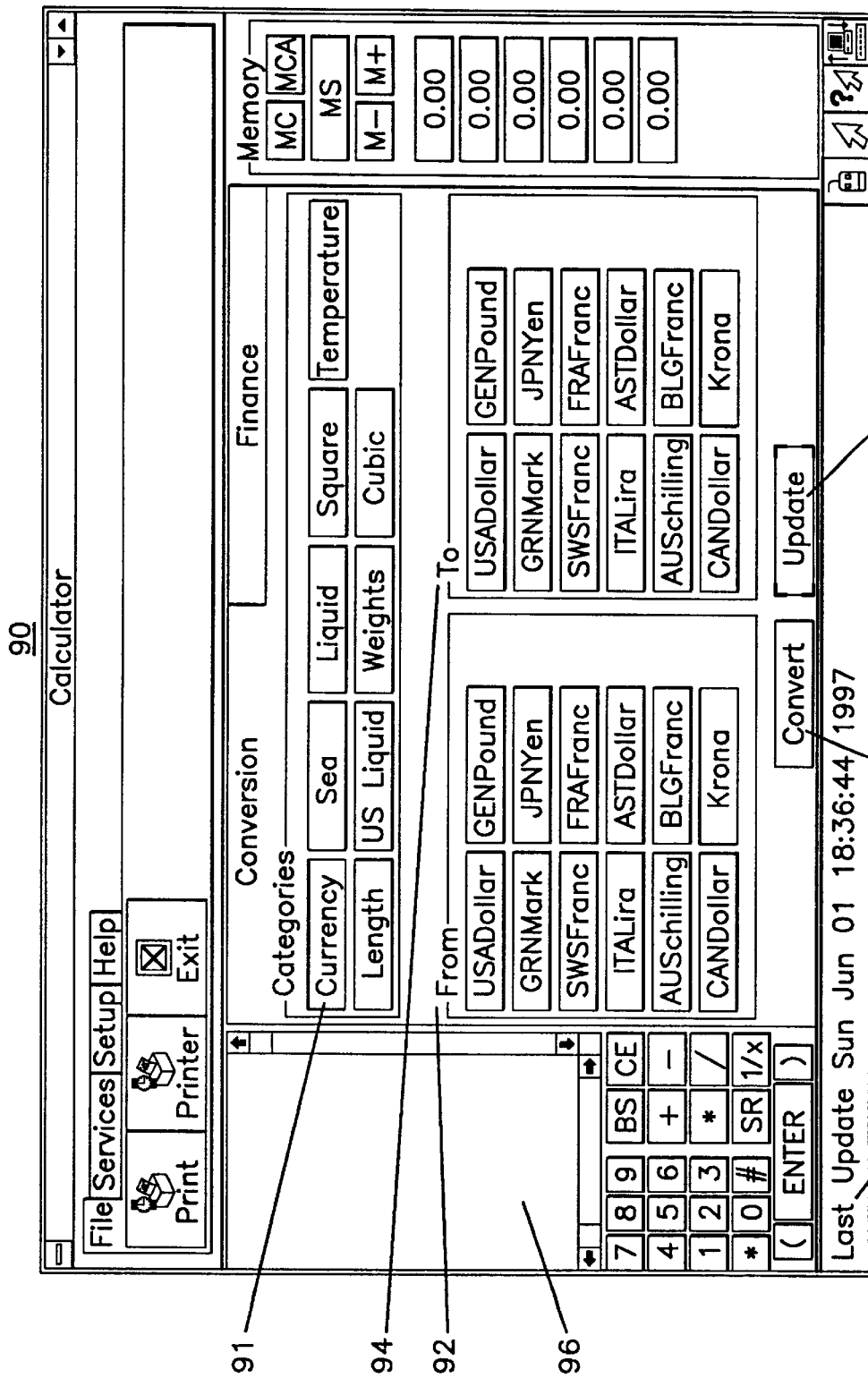
FIG. 4 illustrates a graphic user interface of an exemplary embodiment of the present invention.

FIG. 4 illustrates a graphic user interface of an exemplary embodiment of the present invention. The graphic user interface (GUI) 90 can be used in conjunction with a mouse-like device and an on-screen pointer; or the GUI 90 can be used with a stylus or a touch-sensitive screen. Depressing a button 91 can select a particular database. Other databases (not shown) are used to configure the GUI and to create its overall look and feel (e.g., colors, fonts, icons, sounds). Some databases, such as the conversions for length or weight, are static and do not need to be updated. Other conversions such as currency rates need to be updated periodically, e.g., weekly, daily, or at the start of a new trip.

As shown in FIG. 4, a GUI 90 can assist the user in converting from a group of default currencies 92 to default currencies 94. In a preferred embodiment, the application attempts to predict what conversions the user wants to make based on previous conversions, the location of the device, and/or recent phone calls made by the device. If the desired currency is not shown, then the user can select from an additional menu of currencies, and if necessary, the application will obtain the necessary currency rate and add this currency to the display panel. In addition, the GUI 90 can display a ticker tape history 96 and should have a display 98 which indicates when the currency rates were last updated.

If the user wants to update the currency rates, the user can select the update control 100. When the user selects the update control 100 or the application is updating itself automatically, a thread is launched which runs as a concurrent process in the background of the application. The user can continue to use other features of the application even while the update is taking place. In some embodiments, the update control button 100 is rendered on the GUI 90 as if it was depressed and retains this depressed appearance until the database is updated. When the update is finished, the update control button 100 is returned to its normal appearance. The user can select the convert button 102 to perform the currency conversion calculation.

Figure 5:
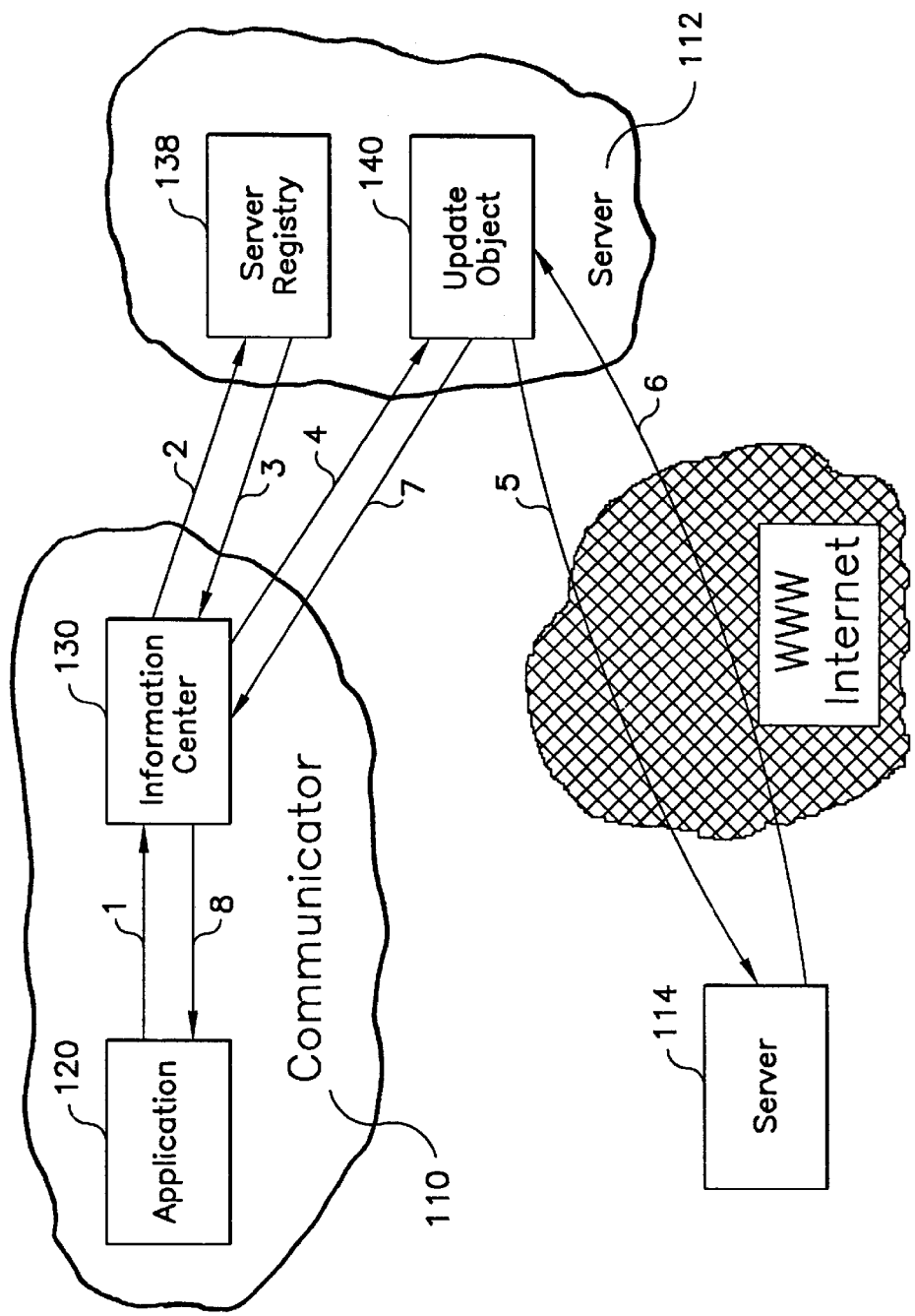
FIG. 5 is a diagram for interfacing with a server on the World Wide Web (WWW) to update a database in accordance with the present invention.

FIG. 5 is a diagram for interfacing with a server on the World Wide Web (WWW) to update a database in accordance with the present invention. In step 1, an application 120 running on a communicator 10 sends a request for an update to an information center 130. The information center 130 is a program on the communicator 110 responsible for retrieving information from a server 112.

In step 2, the information center 130 sends a query to server 112. The server 112 has a server registry 138. The server registry 138 is a program that stores the address of all the different services available. The information center 130 queries the server registry 138 to find out the address or the contact information for an update object.

In step 3, the server registry 138 returns the address of the update object to the information center 130. The update object is responsible for accessing update information from the internet. It provides the information necessary to access a particular server on the WWW, including the HTTP (hypertext transfer protocol) address, and interfaces with the server/website in order to obtain the update information. It will be appreciated by those skilled in the art that the server 112 can run an IDL to create the update object 140.

In step 4, the information center 130 requests the update object 140 for an update.

In step 5, the update object 140 interfaces with a remote server 114 to obtain the update information.

In step 6, update information flows across the update object 140.

In step 7, the update object 140 returns to the information center 130 the update information.

In step 8, the information center 130 provides an updated database to the application 120.

Figure 6:
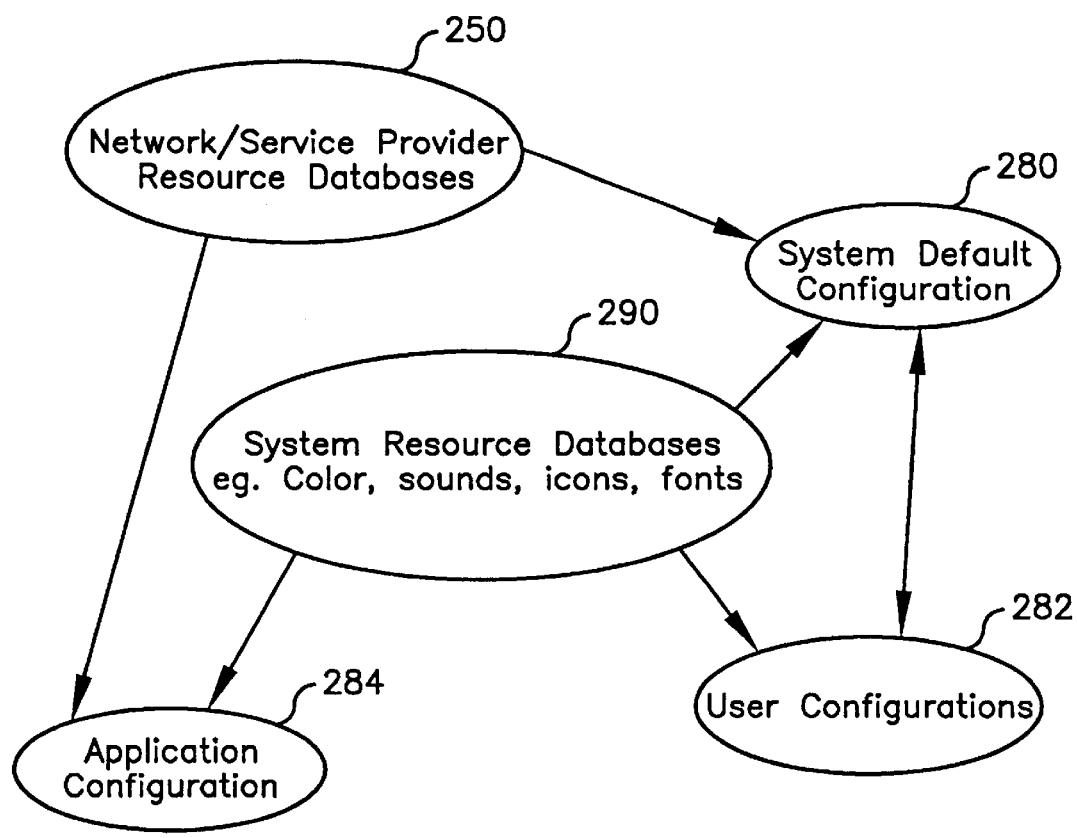
FIG. 6 illustrates the interrelationship of databases in an exemplary embodiment of the present invention.

FIG. 6 illustrates the interrelationship of databases in a preferred embodiment of the present invention. Each database can be specified as local or global. As discussed above, a computer can obtain a database from a network or a service provider 250. The database can be used to configure the entire system 280 or just a particular application 284. As the user uses the computer, he can override the default settings to create his own settings. He can also choose from databases located on the computer locally 290 to configure the entire system 280, his user settings 282, or a particular application 284. An application can achieve its own custom look and feel by defining its own set of properties or overriding existing properties. If the user desires, he can specify that a local change 283 be designated as a global change 281 such that the local change 283 is made in other applications. That is, the user can convert a local change into a global change.

As mentioned above, databases can be downloaded based on location changes of the device. For example, when a device owner travels to Sweden, the editor or another application can obtain a Swedish language database or the latest Swedish Geography database and travel information. This information may already be cached locally, but if it is not, it can be obtained from a service provider 250. Cached databases can be purged to create room for newer databases. A new database might be used for only a particular application 284 or it might be used to change the entire system 280.

Figure 7:
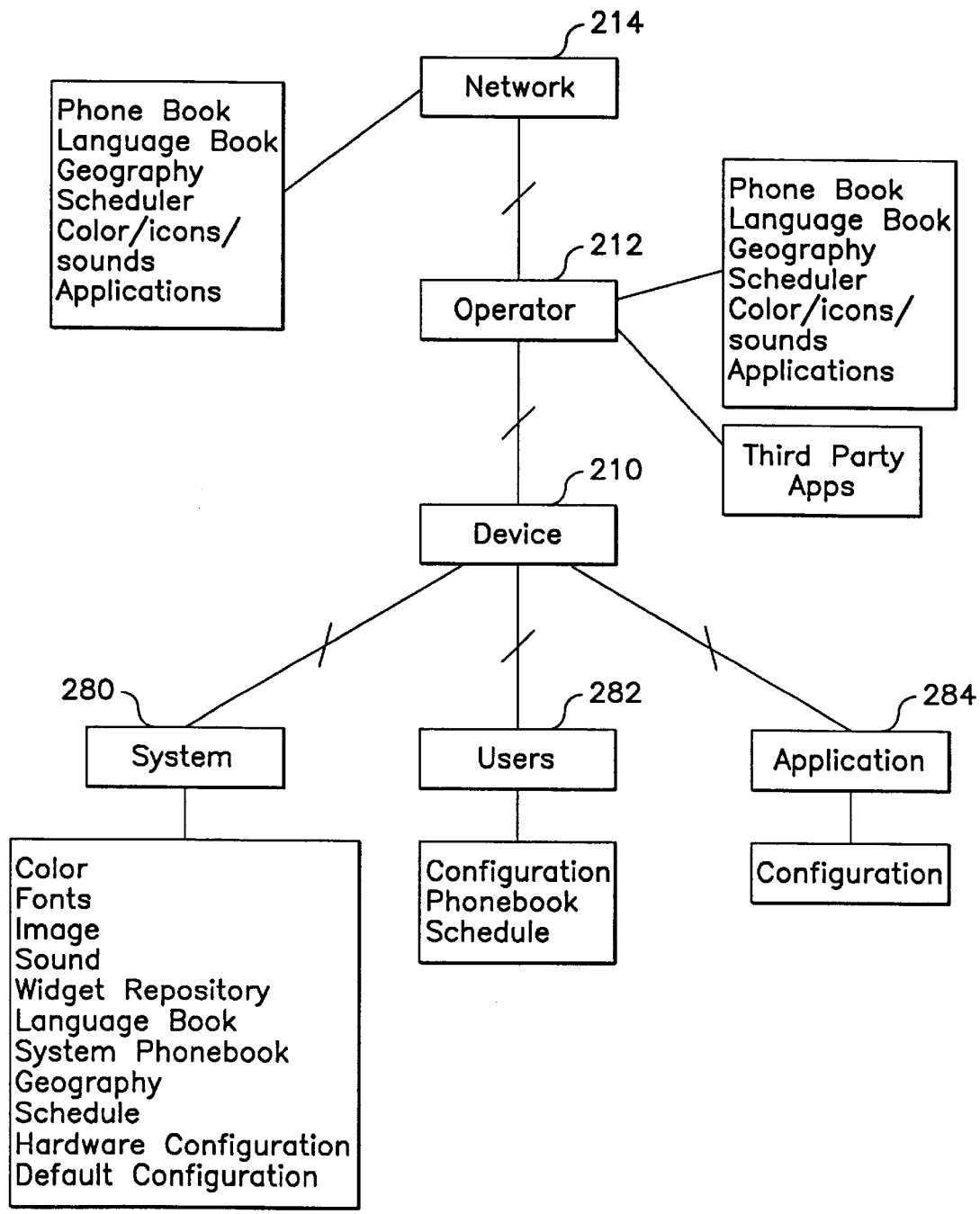
FIG. 7 illustrates a hierarchical architecture of databases in an exemplary embodiment of the present invention.

FIG. 7 illustrates a hierarchical architecture of databases in a preferred embodiment of the present invention. A device 210 can obtain databases from a local operator 212. The local operator 212 might offer databases that are specific to a particular location, e.g., maps or phone books. The device can also obtain databases from a remote network 214. The network 214 may provide databases not available from operator 212. Databases that are available in the device 210 can be specified as global databases 81, user-specific databases 82, or application-specific databases 83.

Numerous variations or modifications of the disclosed invention will be evident to those skilled in the art. While the foregoing description makes reference to particular illustrative embodiments, this patent is intended to cover all variations or modifications that do not depart from the spirit and scope of the disclosed invention.

What is claimed is:

1. A system for updating a database comprising:
   an electronic device having access to a local database;
   a request generator, within the electronic device that automatically generates an indirect request based upon an occurrence of an event other than a direct user request;
   a query generator that generates a query from the indirect request;
   a server responding to the query to obtain information from a second database wherein the server parses the obtained information to eliminate irrelevant information; and
   an update device updating the local database with the obtained relevant information.

2. The system in accordance with claim 1, wherein the generated request is automatically generated at pre-set intervals.

3. The system in accordance with claim 1, wherein the second database is remote from the local database.

4. The system in accordance with claim 1, wherein the system includes an application that indicates the time the local database was last updated.

5. The system in accordance with claim 1, wherein the request generator first determines whether the information to be obtained is available within the electronic device.

6. The system in accordance with claim 5, wherein if the information is determined to be available within the electronic device, the query generator is instructed to not generate a query, and the local database is updated with the available information.

7. The system in accordance with claim 1, wherein the generated request is automatically generated when the electronic device physically moves from a first location to a second location.

8. A method for updating a database comprising the steps of:
   automatically generating a request to update a database within an electronic device based on the occurrence of an event other than a direct user request;
   generating a query based on the generated request and transmitting the query to a server;
   obtaining information by the server, the information including information which is responsive to the query and information which is extraneous to the query, and
   parsing out the extraneous information and providing the responsive information to the electronic device to update the database.

9. The method in accordance with claim 8, wherein the step of automatically generating a request is performed at pre-set intervals.

10. The method in accordance with claim 8, wherein the information is obtained from a second database which is remote from the database to be updated.

11. The method in accordance with claim 8, wherein the step of automatically generating a request includes first determining whether the information to be obtained is available within the electronic device.

12. The method in accordance with claim 11, wherein if the information is determined to be available within the electronic device, the step of generating a query is skipped, and the database is updated with the available information.

13. The method in accordance with claim 8, wherein the generated request is automatically generated when the electronic device physically moves from a first location to a second location.

14. A method of updating a database, comprising:
   automatically generating a request to update a database within an electronic device with information from a file external to the electronic device;
   generating a script file responsive to the generated request, wherein the script file interfaces with the remote file to extract the information;

parsing the extracted information to eliminate information responsive to the script file but not responsive to the generated request; and updating the database with the parsed information.

15. The method in accordance with claim 14, wherein the request is generated based upon the occurrence of an event other than a direct user request.

16. The method in accordance with claim 14, wherein the request is generated based on elapsed time since a previous database update.

17. The method in accordance with claim 14, wherein the request is generated based on a determination that the electronic device has changed location since the database was last accessed.

18. The method in accordance with claim 14, wherein the request is generated based on a determination that a telephone call has originated from the electronic device to a country external to the country in which the electronic device is located.

19. A method of updating a database, comprising:

automatically generating a request to update a database with information from a remote file, wherein said request is generated without user intervention;

applying a script file to the generated request, wherein the script file interfaces with the remote file to extract the information;

parsing the extracted information to eliminate irrelevant information; and updating the database with the extracted relevant information.

20. A method of updating a database, comprising:

automatically generating a request to update a database with information from a remote file; and checking whether the information is available locally, wherein if the information is determined to be available locally, the database is updated according to a local update method comprising:

determining whether sufficient memory space exists locally to receive the information, wherein if insufficient memory space exists, non-essential files are purged to create additional memory space; and updating the database with the information.

21. An apparatus for updating a database, comprising:

a request generator operable to automatically generate an indirect request to update a database based upon the occurrence of an event other than a user request to update the database;

a query generator operable to generate a query responsive to the generated request to update the database;

an information server operable to receive information responsive to the generated query, wherein the received information which is non-responsive to the indirect request is parsed; and an update device operable to update the database with the parsed information.

22. The apparatus in accordance with claim 21, wherein the request generator is configured to generate a request automatically when the request generator moves to a new physical location.

23. The apparatus in accordance with claim 21, wherein the request generator is configured to generate a request automatically a pre-set intervals.

* * * * *